(12) United States Patent
Onishi et al.

(10) Patent No.: US 9,446,567 B2
(45) Date of Patent: Sep. 20, 2016

(54) SYNTHETIC RESIN LAMINATE

(71) Applicants: MITSUBISHI GAS CHEMICAL COMPANY, INC., Chiyoda-ku, Tokyo (JP); MGC FILSHEET CO., LTD., Saitama (JP)

(72) Inventors: Takeshi Onishi, Tokyo (JP); Osamu Kakinoki, Tokyo (JP); Yasuyoshi Nakayasu, Tokyo (JP); Hidetaka Shimizu, Ibaraki (JP); Hirohiko Aikawa, Ibaraki (JP)

(73) Assignees: MITSUBISHI GAS CHEMICAL COMPANY, INC., Tokyo (JP); MGC FILSHEET CO., LTD., Saitama (JP)

( * ) Notice: Subject to any disclaimer, the term of this patent is extended or adjusted under 35 U.S.C. 154(b) by 17 days.

(21) Appl. No.: 14/428,759

(22) PCT Filed: Sep. 20, 2013

(86) PCT No.: PCT/JP2013/075430
§ 371 (c)(1),
(2) Date: Mar. 17, 2015

(87) PCT Pub. No.: WO2014/046230
PCT Pub. Date: Mar. 27, 2014

(65) Prior Publication Data
US 2015/0224748 A1  Aug. 13, 2015

(30) Foreign Application Priority Data

Sep. 21, 2012 (JP) ................. 2012-207788

(51) Int. Cl.
| B32B 27/08 | (2006.01) |
| B32B 27/36 | (2006.01) |
| B29C 45/14 | (2006.01) |
| C08L 33/12 | (2006.01) |
| C08L 69/00 | (2006.01) |
| B32B 27/30 | (2006.01) |
| B05D 3/00 | (2006.01) |
| C08L 67/02 | (2006.01) |
| B29K 33/00 | (2006.01) |

(52) U.S. Cl.
CPC ............... *B32B 27/08* (2013.01); *B05D 3/007* (2013.01); *B29C 45/14* (2013.01); *B29C 45/14778* (2013.01); *B32B 27/308* (2013.01); *B32B 27/36* (2013.01); *B32B 27/365* (2013.01); *C08L 33/12* (2013.01); *C08L 67/02* (2013.01); *C08L 69/00* (2013.01); *B05D 2201/04* (2013.01); *B29K 2033/08* (2013.01); *B29K 2995/0026* (2013.01); *B32B 2250/24* (2013.01); *B32B 2270/00* (2013.01); *B32B 2307/412* (2013.01); *B32B 2307/536* (2013.01); *B32B 2307/558* (2013.01); *B32B 2307/71* (2013.01); *B32B 2307/738* (2013.01); *B32B 2457/00* (2013.01); *B32B 2601/00* (2013.01); *B32B 2605/003* (2013.01); *Y10T 428/2495* (2015.01); *Y10T 428/24802* (2015.01); *Y10T 428/24967* (2015.01); *Y10T 428/31507* (2015.04)

(58) Field of Classification Search
CPC ..... B32B 27/08; B32B 27/308; C08L 69/00; Y10T 428/2495; Y10T 428/24967; Y10T 428/31507
See application file for complete search history.

(56) References Cited

U.S. PATENT DOCUMENTS

| 2007/0243339 | A1  | 10/2007 | Koestner |
| 2009/0263663 | A1  | 10/2009 | Ogawa et al. |
| 2011/0086227 | A1* | 4/2011  | Minemura ............ B32B 27/08 428/412 |
| 2012/0183780 | A1  | 7/2012  | Ogawa et al. |

FOREIGN PATENT DOCUMENTS

| CN | 101560319    | 10/2009 |
| CN | 101983221    | 3/2011  |
| JP | 64-69625     | 3/1989  |
| JP | 3142774      | 3/2001  |
| JP | 2005-247885  | 9/2005  |
| JP | 2006-316124  | 11/2006 |
| JP | 2008-238618  | 10/2008 |
| JP | 2009-196153  | 9/2009  |
| JP | 2009-256408  | 11/2009 |
| JP | 2010-116501  | 5/2010  |
| WO | 2009/104399  | 8/2009  |
| WO | 2009/116361  | 9/2009  |
| WO | 2013/172381  | 11/2013 |

OTHER PUBLICATIONS

International Search Report issued Dec. 17, 2013 in PCT/JP2013/075430.

\* cited by examiner

*Primary Examiner* — Betelhem Shewareged
(74) *Attorney, Agent, or Firm* — Greenblum & Bernstein, P.L.C.

(57) ABSTRACT

The present invention has an object of providing a synthetic resin laminate that is usable for a transparent substrate material or protective material, has high thermoformability (pressure formability, thermal-bending formability), high insert moldability, and high surface hardness and/or impact resistance, and also providing a molded body formed by molding such a synthetic resin laminate. The synthetic resin laminate includes a polycarbonate-based substrate layer; and a resin laminated on one of, or both of, two surfaces of the polycarbonate-based substrate layer, the resin containing a specific (meth)acrylate copolymer resin and a specific polycarbonate resin. The polycarbonate-based substrate layer includes a polymer alloy and thus has a glass transition temperature (Tg) of 110 to 130° C. Thus, the resultant synthetic resin laminate has high thermoformability and high surface hardness.

13 Claims, No Drawings

SYNTHETIC RESIN LAMINATE

TECHNICAL FIELD

The present invention relates to a synthetic resin laminate, and more specifically relates to a synthetic resin laminate that is usable for a transparent substrate material or protective material, includes a polycarbonate substrate layer and a resin layer (high-hardness layer) containing a specific (meth) acrylate copolymer resin and a specific polycarbonate resin, and has high thermoformability (pressure formability, thermal-bending formability), high insert moldability and high surface hardness and/or impact resistance; and also to a molded body formed by molding such a synthetic resin laminate.

BACKGROUND ART

For vehicle interiors, housings of household electric and electronic appliances and also housings of compact mobile devices, a decorative molded body in which a decorative film including a design layer is integrated with a resin molded body is widely used. The integral decorative molded body is produced by attaching a resin molded body to the design layer of the decorative film. The decorative molded body thus obtained has an external appearance which causes a viewer to perceive that the molded body has a certain depth. Such a decorative molded body also has an advantage that the decorative layer is not deteriorated due to abrasion even after being used for a long time.

According to one exemplary method for integrating the resin molded body and the decorative film, the decorative film is inserted into a mold for injection molding without being preliminarily molded, and a melted resin is injected into the mold, so that an injection-molded body is formed and at the same time, the decorative film is bonded to the molded body. According to another exemplary method for integrating the resin molded body and the decorative film, the decorative film is preliminarily molded by thermoforming (vacuum forming, air-pressure forming, vacuum-pressure forming, etc.) and set in a mold for injection molding, and a melted resin is injected into the mold, so that an injection-molded body is formed and at the same time, the molded body is integrated with the preliminarily molded decorative film.

A transparent sheet to be subjected to printing that is used for forming a decorative film may be, for example, a polycarbonate single-layer sheet or an acrylic resin single-layer sheet. The polycarbonate single-layer sheet has high toughness and high flexibility but has a problem of having low surface hardness and thus allowing the surface of the molded body to be scratched easily.

Although polycarbonate is not highly evaluated as a material for a decorative film, the following methods, for example, are available to increase the surface hardness of a polycarbonate molded body: a method of using polycarbonate having a specific structural unit (Patent Document 1); and a method of using a resin composition formed of polycarbonate and a specific (meth)acrylate copolymer (Patent Document 2).

By contrast, the acrylic resin single-layer film has high surface hardness and thus high scratch resistance but has low toughness and low flexibility. Therefore, the acrylic resin single-layer film has problems of being difficult to be formed and being damaged, for example, broken while being handled or transported.

As a film that alleviates these problems, a film containing acrylic rubber particles incorporated into the acrylic resin and thus having an increased flexibility has been proposed (Patent Document 3).

As a film having both of high flexibility and high surface hardness, a laminate film of acrylic resin and polycarbonate has been proposed (Patent Document 4). Such a laminate film has a molded body surface of acrylic resin and a printing surface of polycarbonate, and thus has toughness and flexibility higher than or equal to those of the acrylic resin single-layer film while maintaining the surface hardness of the acrylic resin.

However, such multi-layer films may have a molding flaw such as whitening, cracking, foaming or the like caused at the time of molding due to the high thermoforming temperature. This significantly narrows the molding conditions. In addition, in order to maintain the hardness of the film, the acrylic resin layer needs to have a certain thickness. Therefore, as the total thickness of the film is smaller, the ratio of the thickness of the acrylic resin layer with respect to the total thickness is higher. This significantly decreases the toughness and the flexibility of the film. Furthermore, when the hard-coated film is to be molded by thermoforming, the processing temperature needs to be the processing temperature for polycarbonate. This causes conspicuous whitening, cracking, foaming or the like to the hard-coat on the acrylic resin layer.

For lowering the thermoforming temperature, the following methods are available: a method of using a polycarbonate resin composition having a lower deflection temperature under load (ISO75, load of 1.8 MPa) for a laminate sheet of acrylic resin and polycarbonate (Patent Document 5); and a method of performing polymer alloying of a polycarbonate resin layer and a different resin (aromatic polyester) to lower the glass transition temperature (Tg) of the polycarbonate resin layer and thus to lower the molding temperature (Patent Document 6). However, in such multi-layer sheets also, the acrylic resin layer needs to have a certain thickness in order to maintain the surface hardness. Therefore, as the total thickness of the film is smaller, the ratio of the thickness of the acrylic resin layer with respect to the total thickness is higher. This significantly decreases the toughness and the flexibility of the film. In addition, the above-described documents do not describe a laminate resin sheet including a hard-coat layer provided on a surface of the acrylic resin layer.

CITATION LIST

Patent Literature

Patent Document 1: Japanese Laid-Open Patent Publication No. Sho 64-69625
Patent Document 2: Japanese Patent Publication No. 2010-116501
Patent Document 3: Japanese Patent No. 3142774
Patent Document 4: Japanese Patent Publication No. 2006-316124
Patent Document 5: Japanese Laid-Open Patent Publication No. 2008-238618
Patent Document 6: Japanese Laid-Open Patent Publication No. 2009-196153

SUMMARY OF INVENTION

Technical Problem

The present invention has an object of providing a synthetic resin laminate that is usable for a transparent substrate material or protective material, has high thermoformability (pressure formability, thermal-bending formability), high insert moldability, and high surface hardness and/or impact resistance; and also providing a molded body formed by molding such a synthetic resin laminate.

Solution to Problem

As a result of active studies for solving the above-described problems, the present inventors found that a synthetic resin laminate having high thermoformability and high surface hardness is obtained by laminating a resin containing a specific (meth)acrylate copolymer resin and a specific polycarbonate resin on one of, or both of, two surfaces of a polycarbonate-based substrate layer, the polycarbonate-based substrate layer including a polymer alloy thus having a glass transition temperature (Tg) of 110 to 130° C. Thus, the present inventors achieved the present invention.

Namely, the present invention provides a synthetic resin laminate described below and a molded body using the synthetic resin laminate.

<1> A synthetic resin laminate, comprising:
a resin layer including a resin (A) containing a (meth)acrylate copolymer (a1) and a polycarbonate (a2), and a substrate layer including a polycarbonate-based resin (B), the resin layer being laminated on one of, or both of, two surfaces of the substrate layer;
wherein:
the (a1) is a (meth)acrylate copolymer containing 5 to 80% by mass of aromatic (meth)acrylate unit (a11) and 20 to 95% by mass of methyl methacrylate unit (a12);
the (a2) is a polycarbonate (a2) including a structural unit represented by the following formula [1]:

[Chemical formula 1]

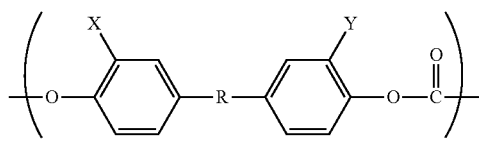

(in the formula [1], R represents a single bond, an alkylene group having 1 through 6 carbon atoms, an arylene group having 6 through 10 carbon atoms, or a cyclic alkylene group having 3 through 8 carbon atoms; and X and Y independently represent a hydrogen atom or an alkyl group having 1 through 6 carbon atoms);
the resin (A) contains the (a1) at a ratio of 15 to 49% by mass and the (a2) at a ratio of 85 to 51% by mass;
the polycarbonate-based resin (B) is a polymer alloy of a polycarbonate (b1) formed of the formula [1] and a polyester resin (b2); and
the polymer alloy has a glass transition temperature (Tg) of 110 to 130° C.

<2> The synthetic resin laminate according to <1> above, wherein the polyester resin (b2) is an aromatic polyester resin.

<3> The synthetic resin laminate according to <1> or <2> above, wherein the polycarbonate (b1) and the polyester resin (b2) have a mixing ratio by mass of b1:b2=30:70 to 75:25.

<4> The synthetic resin laminate according to any one of <1> through <3> above, wherein the polycarbonate (a2) is a polycarbonate homopolymer or copolymer containing 20 to 100% by mass of structural unit of the following formula [2]:

[Chemical formula 2]

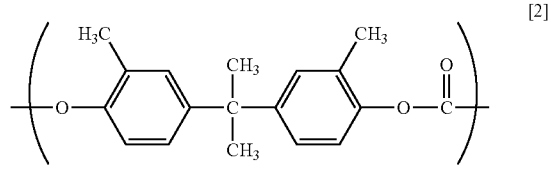

and 80 to 0% by mass of structural unit of the following formula [3]:

[Chemical formula 3]

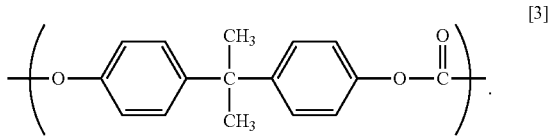

<5> The synthetic resin laminate according to any one of <1> through <3> above, wherein the polycarbonate (a2) is a polycarbonate homopolymer formed of the structural unit of the formula [3].

<6> The synthetic resin laminate according to any one of <1> through <5> above, wherein the polyester resin (b2) is a copolymer polyester obtained as a result of a part of ethyleneglycol in polyethyleneterephthalate being substituted with cyclohexanedimethanol.

<7> The synthetic resin laminate according to any one of <1> through <6> above, wherein the (meth)acrylate copolymer (a1) has a weight-average molecular weight of 5,000 to 30,000 and the polycarbonate (a2) has a weight-average molecular weight of 21,000 to 43,000.

<8> The synthetic resin laminate according to any one of <1> through <7> above, wherein the resin layer including the resin (A) has a thickness of 30 to 120 μm, the synthetic resin laminate has a total thickness of 0.1 to 2.0 mm, and the ratio of the thickness of the resin layer/total thickness of the synthetic resin laminate is 0.01 to 0.5

<9> The synthetic resin laminate according to any one of <1> through <8> above, wherein the resin layer and/or the substrate layer contains an ultraviolet absorber.

<10> The synthetic resin laminate according to any one of <1> through <9> above, wherein the resin layer including the resin (A) is laminated only on one surface of the substrate layer including the polycarbonate-based resin (B), and the resin layer including the resin (A) and the substrate layer including the polycarbonate-based resin (B) are hard-coated.

<11> A molded body, formed by preparing a printing layer on the substrate layer of the synthetic resin laminate according to any one of <1> through <10>, forming a hard-coat layer on the resin layer of the synthetic resin laminate so as to form a hard-coat sheet, and two-dimensionally bending the hard-coat sheet under heating and pressurization.

<12> A three-dimensional molded body, formed by preparing a printing layer on the substrate layer of the synthetic resin laminate according to any one of <1> through <10>, forming a hard-coat layer on the resin layer of the synthetic resin laminate so as to form a hard-coat sheet, and air-pressure-forming the hard-coat sheet under heating and pressurization.

<13> An in-molded body, formed by preparing a printing layer on one surface of the synthetic resin laminate according to any one of <1> through <10>, thermoforming the resultant resin laminate, and injection molding a melted resin on the printing layer so as to form a lining layer.

Advantageous Effects of Invention

The present invention provides a synthetic resin laminate preferable to form components of personal computers, mobile phones, car navigation devices and the like by thermoforming such as vacuum forming, air-pressure forming or the like; a hard-coated sheet including such a synthetic resin laminate and a hard-coat provided on the synthetic resin laminate; and a hard-coated molded body obtained as a result of molding such a synthetic resin laminate or such a hard-coated sheet.

A resin layer containing a specific (meth)acrylic copolymer resin and a specific polycarbonate resin is used for a surface layer. As a result, a synthetic resin laminate having high flexibility, high surface hardness and high thermoformability is provided. Such a synthetic resin laminate according to the present invention is preferably usable for a decorative film/sheet.

DESCRIPTION OF EMBODIMENTS

Hereinafter, production examples, examples and the like according to the present invention will be described by way of illustrative examples. The present invention is not limited to the production examples, the examples and the like described below, and may be carried out in any modification without significantly departing from the gist of the present invention.

The present invention is directed to a synthetic resin laminate, comprising: a resin layer (high-hardness layer) including a resin (A) containing a (meth)acrylate copolymer (a1) and a polycarbonate (a2), and a substrate layer including a polycarbonate-based resin (B), the resin layer being laminated on one of, or both of, two surfaces of the substrate layer; wherein: the (a1) is a (meth)acrylate copolymer containing 5 to 80% by mass of aromatic (meth)acrylate unit (a11) and 20 to 95% by mass of methyl methacrylate unit (a12); the (a2) is a polycarbonate (a2) including a structural unit represented by the following formula [1]:

[Chemical formula 4]

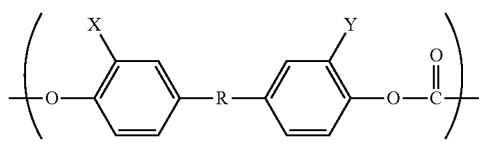

[1]

(in the formula [1]R represents a single bond, an alkylene group having 1 through 6 carbon atoms, an arylene group having 6 through 10 carbon atoms, or a cyclic alkylene group having 3 through 8 carbon atoms; and X and Y independently represent a hydrogen atom or an alkyl group having 1 through 6 carbon atoms); the resin (A) contains the (a1) at a ratio of 15 to 49% by mass and the (a2) at a ratio of 85 to 51% by mass; the polycarbonate-based resin (B) is a polymer alloy of a polycarbonate (b1) formed of the formula [1] and a polyester resin (b2); and the polymer alloy has a glass transition temperature (Tg) of 110 to 130° C. Preferably, the glass transition temperature (Tg) of the polymer alloy is 115 to 125° C.

<(Meth)Acrylate Copolymer (a1)>

The (a1) used in the laminate according to the present invention is a (meth)acrylate copolymer containing 5 to 80% by mass of aromatic (meth)acrylate unit (a11) and 20 to 95% by mass of methyl methacrylate unit (a12).

An aromatic (meth)acrylate is a (meth)acrylate including an aromatic group in an ester moiety thereof. Examples of the aromatic (meth)acrylate include phenyl (meth)acrylate and benzyl (meth)acrylate. These materials may be used independently or in a combination of two or more. Among these, phenyl methacrylate and benzyl methacrylate are preferable. Phenyl methacrylate is more preferable. The (meth)acrylate unit (a11) can increase the transparency of a molded body including the (meth)acrylate unit (a11) mixed with the aromatic polycarbonate resin.

The methyl methacrylate (a12) has a feature of being well dispersed with the polycarbonate-based resin and thus transferring to the surface of the molded body, and therefore can increase the surface hardness of the molded body.

In the (meth)acrylate copolymer (a1) used in the present invention, the ratio by mass of (a11)/(a12) is 5 to 80/20 to 95. When the content of the aromatic (meth)acrylate unit (a11) in the (a1) is higher than or equal to 5% by mass, the transparency is maintained in a high concentration region of the (a1). When the content of the aromatic (meth)acrylate unit (a11) in the (a1) is lower than or equal to 80% by mass, the compatibility of the aromatic (meth)acrylate unit (a11) with the aromatic polycarbonate is not too high and thus the transferability of the aromatic (meth)acrylate unit (a11) to the surface of the molded body is not decreased. Therefore, the surface hardness of the molded body is not decreased.

The weight-average molecular weight of the (meth)acrylate copolymer (a1) is preferably 5,000 to 30,000, and more preferably 10,000 to 25,000. When the weight-average molecular weight is 5,000 to 30,000, the compatibility of the (meth)acrylate copolymer (a1) with the aromatic polycarbonate is good, which provides an excellent effect of increasing the surface hardness. The weight-average molecular weight (Mw), the number-average molecular weight (Mn), and the molecular weight distribution (Mw/Mn) of the (a1) can be measured by gel permeation chromatography performed by use of THF or chloroform as a solvent.

<Polycarbonate (a2)>

The polycarbonate (a2) used in the present invention includes the structural unit of the formula [1], and may be either a homopolymer or a copolymer that includes the structural unit of the formula [1]. The copolymer may be a copolymer including only the structural unit of the formula [1], or a copolymer polycarbonate including the structural unit of the formula [1] and also a structural unit of a formula [3]. In the case where such a copolymer is used, the ratio of the structural unit of the formula [3] with respect to the copolymer is preferably lower than or equal to 80% by mass.

As the structural unit of the formula [1], a structural unit of the following formula [2] is especially preferable.

Namely, in a preferable embodiment according to the present invention, the polycarbonate (a2) is a polycarbonate homopolymer or copolymer containing 20 to 100% by mass of the structural unit of the following formula [2]:

[Chemical formula 5]

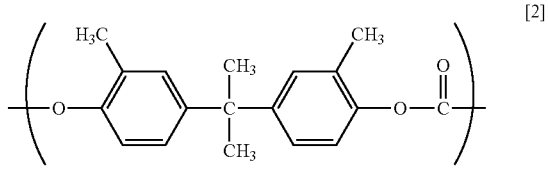

[2]

and 80 to 0% by mass of the structural unit of the following formula [3]:

[Chemical formula 6]

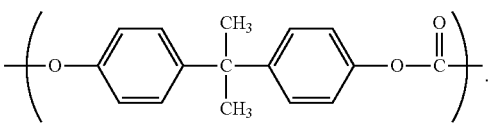

[3]

Preferably, the polycarbonate (a2) used in the present invention is a polycarbonate homopolymer or copolymer containing 30 to 100% by mass of the structural unit of the formula [2] and 70 to 0% by mass of the structural unit of the formula [3].

In the present invention, the weight-average molecular weight of the polycarbonate (a2) is determined by the ease of mixing (dispersing) the polycarbonate (a2) with the (meth)acrylate copolymer (a1) and the ease of producing the resin (A). Specifically, when the weight-average molecular weight of the polycarbonate (a2) is too large, the difference in the melt viscosity between the (a1) and the (a2) is too large. This deteriorates the mixing (dispersion) state of the (a1) and the (a2), which causes an inconvenience that the transparency of the resin (A) is decreased or that melt-kneading cannot be continued stably. By contrast, when the weight-average molecular weight of the polycarbonate (a2) is too small, the strength of the resin (A) is decreased. This causes a problem that the impact resistance of the synthetic resin laminate is decreased. The weight-average molecular weight of the polycarbonate (a2) is preferably in the range of 21,000 to 43,000, more preferably in the range of 24,000 to 42,000, and still more preferably in the range of 27,000 to 40,000.

<Resin (A): Mixture of the (Meth)Acrylate Copolymer (a1) and the Polycarbonate (a2)>

In the present invention, the composition ratio of the (meth)acrylate copolymer (a1) and the polycarbonate (a2) is as follows. The content of the (a1) component is 15 to 49% by mass, and the content of the (a2) component is 85 to 51% by mass. Preferably, the content of the (a1) component is 20 to 49% by mass, and the content of the (a2) component is 80 to 51% by mass. With a composition ratio in such a range, the resin (A) maintains the transparency at a certain level while having a good balance of various properties including the surface hardness, the impact resistance and the water absorption.

<Polycarbonate (b1)>

The polycarbonate (b1) used in the present invention may be any material, with no specific limitation, that includes a carbonate ester bond in a molecular main chain, namely, includes a —[O—R—OCO]— unit (R is an aliphatic group or an aromatic group, includes both of an aliphatic group and an aromatic group, or has a straight chain structure or a branched chain structure). Especially preferably, the polycarbonate (b1) is a polycarbonate including the structural unit of the formula [1]. With such a polycarbonate, a resin laminate having high impact resistance can be obtained.

In the present invention, the weight-average molecular weight of the polycarbonate (b1) influences the impact resistance and the molding conditions of the synthetic resin laminate. Specifically, when the weight-average molecular weight of the polycarbonate (b1) is too small, the impact resistance of the synthetic resin laminate is decreased, which is not preferable. When the weight-average molecular weight of the polycarbonate (b1) is too large, an excessive amount of heat may be needed to laminate the resin layer including the resin (A) (hereinafter, such a resin layer may be referred to as a "high-hardness layer"), which is not preferable. In addition, when the weight-average molecular weight is too large, a certain molding method needs a high temperature, which exposes the resin (A) to the high temperature. As a result, the thermal stability of the resin (A) may be adversely influenced. The weight-average molecular weight of the polycarbonate (b1) is preferably 18,000 to 43,000, more preferably 23,000 to 42,000, and still more preferably 27,000 to 40,000.

<Polyester Resin (b2)>

The polyester resin (b2) may be any material that can be melt-blended (mixed and melted by heating) with the polycarbonate (b1) to form a polymer alloy and can make the glass transition temperature (Tg) of the polymer alloy to a level lower than the glass transition temperature (Tg) of the polycarbonate (b1), namely, 110 to 130° C.

From such a point of view, the polyester resin (b2) is preferably aromatic polyester or aliphatic polyester.

<Aromatic Polyester>

The aromatic polyester usable as the polyester resin (b2) is, for example, a resin obtained as a result of polycondensation of "aromatic dicarboxylic acid component" and "diol component".

Representative examples of the "aromatic dicarboxylic acid component" include terephthalic acid, isophthalic acid, naphthalene dicarboxylic acid, and the like. Alternatively, the "aromatic dicarboxylic acid component" may be a material obtained as a result of a part of terephthalic acid being substituted with "another dicarboxylic acid component".

Examples of the "another dicarboxylic acid component" include oxalic acid, malonic acid, succinic acid, adipic acid, azelaic acid, sebacic acid, neopentyl acid, isophthalic acid, naphthalene dicarboxylic acid, diphenylether dicarboxylic acid, p-oxybenzoic acid, and the like. These materials may be used independently or in a mixture of two or more. The amount of the another dicarboxylic acid as a substituent may be appropriately selected.

Representative examples of the "diol component" include ethyleneglycol, diethyleneglycol, triethyleneglycol, cyclohexanedimethanol, and the like. Alternatively, the "diol component" may be a material obtained as a result of a part of ethyleneglycol being substituted with "another diol component".

Examples of the "another diol component" include propyleneglycol, trimethyleneglycol, tetramethyleneglycol, hexamethyleneglycol, diethyleneglycol, neopentylglycol, polyalkyleneglycol, 1,4-cyclohexanedimethanol, glycerine, pentaerythritol, trimethylol, methoxypolyalkyleneglycol, and the like. These materials may be used independently or in a mixture of two or more. The amount of the another diol as a substituent may be appropriately selected.

Specific examples of the "aromatic polyester" include polyethyleneterephthalate obtained as a result of polycondensation of terephthalic acid and ethyleneglycol, polybutyleneterephthalate obtained as a result of polycondensation of terephthalic acid or dimethyl terephthalate and 1,4-butanediol, and the like. A "copolymer polyester" containing a dicarboxylic acid component other than terephthalic acid and/or a diol component other than ethyleneglycol may be a preferable aromatic polyester.

Among these materials, preferable examples of the aromatic polyester include a copolymer polyester having a structure obtained as a result of a part of, preferably 55 to 75 mol % of, ethyleneglycol in polyethyleneterephthalate being substituted with cyclohexanedimethanol, a copolymer polyester having a structure obtained as a result of a part of, preferably 10 to 30 mol % of, terephthalic acid moieties in polybutyleneterephthalate being substituted with isophthalic acid moieties, and a mixture of such copolymer polyesters.

It is preferable to select a material, among the aromatic polyesters, which can be melt-blended with the polycarbonate (b1) to form a polymer alloy and can make the glass transition temperature (Tg) of the polymer allow to a level sufficiently lower than the glass transition temperature (Tg) of the polycarbonate (b1).

Most preferable examples of the aromatic polyester include a copolymer polyester having a structure obtained as a result of 50 to 75 mol % of ethyleneglycol, which is a diol component of polyethyleneterephthalate (PET), being substituted with 1,4-cyclohexanedimethanol (1,4-CHDM), a copolymer polyester having a structure obtained as a result of a part of, preferably 10 to 30 mol % of, terephthalic acid moieties in polybutyleneterephthalate (PBT) being substituted with isophthalic acid moieties, and a mixture of such copolymer polyesters. It is known that theses copolymer polyesters are melt-blended with a polycarbonate to reach a completely compatible state and thus to form a polymer alloy.

Whether the components of the polymer blend are in a completely compatible state or not can be checked based on whether the glass transition temperature measured at a heating rate of 10° C./min. by differential scanning calorimetry is of a single value or not.

<Mixing Ratio>

The mixing ratio of the polycarbonate (b1) and the polyester resin (b2) is not limited to any specific value as long as the glass transition temperature (Tg) of the polycarbonate-based resin (B) obtained by the mixing is 110 to 130° C. From the point of view of maintaining the transparency, the mixing ratio by mass is preferably b1:b2=20:80 to 80:20, more preferably b1:b2=30:70 to 75:25, and still more preferably b1:b2=50:50 to 70:30.

<Additives, Etc.>

In the present invention, the resin layer (high-hardness layer) including the resin (A) and/or the substrate layer including the polycarbonate-based resin (B) may have an ultraviolet absorber incorporated thereto. When the content of the ultraviolet absorber is too low, the light resistance is insufficient. When the content of the ultraviolet absorber is too high, an excess part of the ultraviolet absorber is scattered by a high temperature to contaminate the molding environment, resulting in a trouble, in the case where a certain molding method is used. The content of the ultraviolet absorber with respect to the mass of the resin (A) is preferably 0 to 5% by mass, more preferably 0 to 4% by mass, and still more preferably 0 to 3% by mass. Examples of the ultraviolet absorber include benzophenone-based ultraviolet absorbers such as 2,4-dihydroxybenzophenone, 2-hydroxy-4-methoxybenzophenone, 2-hydroxy-4-n-octoxybenzophenone, 2-hydroxy-4-dodecyloxybenzophenone, 2-hydroxy-4-octadecyloxybenzophenone, 2,2'-dihydroxy-4-methoxybenzophenone, 2,2'-dihydroxy-4,4'-dimethoxybenzophenone, 2,2',4,4'-tetrahydroxybenzophenone, and the like; benzotriazole-based ultraviolet absorbers such as 2-(2-hydroxy-5-methylphenyl)benzotriazole, 2-(2-hydroxy-3,5-di-t-butylphenyl)benzotriazole, 2-(2-hydroxy-3-t-butyl-5-methylphenyl)benzotriazole, (2H-benzotriazole-2-yl)-4,6-bis(1-methyl-1-phenylethyl)phenol, and the like; benzoate-based ultraviolet absorbers such as phenyl salicylate, 2,4-di-t-butylphenyl-3,5-di-t-butyl-4-hydroxybenzoate, and the like; hindered amine-based ultraviolet absorbers such as bis(2,2,6,6,-tetramethylpiperidine-4-yl)sebacate, and the like; triazine-based ultraviolet absorbers such as 2,4-diphenyl-6-(2-hydroxy-4-methoxyphenyl)-1,3,5-triazine, 2,4-diphenyl-6-(2-hydroxy-4-ethoxyphenyl)-1,3,5-triazine, 2,4-diphenyl-(2-hydroxy-4-propoxyphenyl)-1,3,5-triazine, 2,4-diphenyl-(2-hydroxy-4-butoxyphenyl)-1,3,5-triazine, 2,4-diphenyl-6-(2-hydroxy-4-butoxyphenyl)-1,3,5-triazine, 2,4-diphenyl-6-(2-hydroxy-4-hexyloxyphenyl)-1,3,5-triazine, 2,4-diphenyl-6-(2-hydroxy-4-octyloxyphenyl)-1,3,5-triazine, 2,4-diphenyl-6-(2-hydroxy-4-dodecyloxyphenyl)-1,3,5-triazine, 2,4-diphenyl-6-(2-hydroxy-4-benzyloxyphenyl)-1,3,5-triazine, and the like; etc. There is no specific limitation on the method of mixing. Usable methods include a method of compounding all the amount, a method of dry-blending the master batch, a method of dry-blending all the amount, and the like.

In the present invention, the resin layer including the resin (A) and/or the substrate layer including the polycarbonate-based resin (B) may have any of various additives incorporated thereto in an amount that does not spoil the effect of the present invention. Usable additives include, for example, antioxidants, anti-coloring agents, antistatic agents, releasing agents, lubricants, dyes, pigments, plasticizers, flame-retardants, resin modifiers, compatibilizers, and reinforcing agents such as organic fillers, inorganic fillers and the like. There is no specific limitation on the method of mixing. Usable methods include a method of compounding all the amount, a method of dry-blending the master batch, a method of dry-blending all the amount, and the like.

<Methods for Laminating Various Materials>

There is no specific limitation on the method for forming the synthetic resin laminate according to the present invention. There are various methods including, for example, a method of laminating the resin layer including the resin (A) and the substrate layer including the polycarbonate-based resin (B), which are formed independently, and causing the two layers to adhere to each other by heating and pressurization; a method of laminating the resin layer including the resin (A) and the substrate layer including the polycarbonate-based resin (B), which are formed independently, and bonding the two layers with an adhesive; a method of coextruding the resin layer including the resin (A) and the substrate layer including the polycarbonate-based resin (B); a method of in-molding and thus integrating the resin layer including the resin (A) and the substrate layer including the polycarbonate-based resin (B), which are formed in advance; and the like. From the points of view of production cost and productivity, the coextrusion method is preferable.

According to one exemplary production method, the resin (A) and the polycarbonate-based resin (B) are heated and melted by separate extruders and extruded from slit-like ejection openings of T-dies and laminated together, and then the resultant laminate is caused to closely adhere to a cooling roll and thus is solidified.

The temperature at which each of the resins is heated and melted by the extruder is preferably higher than the glass transition temperature (Tg) thereof by 80 to 150° C. In general, the temperature of the main extruder for extruding the polycarbonate-based resin (B) is usually 230 to 290° C., and preferably 240 to 270° C. The temperature of the sub extruder for extruding the resin (A) is usually 190 to 260° C., and preferably 200 to 250° C.

A method for coextruding the two types of melted resins may be any known method such as a feed block method, a multi-manifold method or the like.

For example, the feed block method may be performed as follows. Melted resins laminated together by use of a feed block are introduced into a sheet molding die such as a T-die or the like. After the resins are molded into a sheet, the sheet is caused to adhere, by pressurization, to a molding roll having a mirror-finished surface, and is mirror-finished and cooled while passing on the molding roll.

The multi-manifold method may be performed as follows. Melted resins laminated together in a multi-manifold die are molded into a sheet in the die, and the sheet is caused to adhere, by pressurization, to a molding roll, and is surface-finished and cooled.

In any way, the temperature of the die is usually set to 240 to 300° C., and preferably set to 250 to 280° C. The temperature of the molding roll is usually set to 100 to 190° C., and preferably set to 110 to 190° C.

<Resin Laminate>

In the present invention, the thickness of the resin layer (high-hardness layer) including the resin (A) influences the surface hardness and the impact resistance of the synthetic resin laminate. Specifically, when the thickness of the high-hardness layer is too small, the surface hardness is decreased, which is not preferable. When the thickness of the high-hardness layer is too large, the impact resistance is decreased, which is not preferable. The thickness of the high-hardness layer is preferably 10 to 250 µm, more preferably 30 to 200 µm, and still more preferably 40 to 120 µm.

In the present invention, the total thickness of the synthetic resin laminate (sheet) influences the impact resistance thereof. Specifically, when the total thickness is too small, the impact resistance is decreased. When the total thickness is large, the impact resistance is guaranteed to be sufficient. However, when the total thickness is unnecessarily large, an excessive amount of material is used for the substrate layer, which is not economical. The total thickness of the synthetic resin laminate is preferably 0.1 to 2.0 mm, more preferably 0.1 to 1.8 mm, and still more preferably 0.1 to 1.5 mm.

The ratio of the thickness of the resin layer (high-hardness layer) including the resin (A) and the total thickness of the synthetic resin laminate (X), namely, (A)/(X), influences the surface hardness and the impact resistance of the synthetic resin laminate. Specifically, when the thickness ratio is too low, the surface hardness is decreased, which is not preferable. When the thickness ratio is too high, the impact resistance is decreased, which is not preferable. The thickness ratio is preferably 0.01 to 0.5, more preferably 0.015 to 0.5, and still more preferably 0.02 to 0.5.

The synthetic resin laminate according to the present invention is usually produced by an extrusion method. During an extrusion step, or after the extrusion step, the synthetic resin laminate may be hard-coated. It is preferable that the synthetic resin laminate according to the present invention has high abrasion resistance, high fingerprint resistance (property of allowing fingerprints to be wiped out highly easily) and high moldability. From the point of view of productivity, it is especially preferable that the synthetic resin laminate according to the present invention can be processed into a desired shape by being punched out.

The hard-coat layer applicable to the present invention may be formed of a compound usable to form any known crosslinked film such as, for example, an acrylic, silicon-based, melamine-based, urethane-based, or epoxy-based compound. As a curing method, any known method such as an ultraviolet curing method, a thermosetting method, an electron-beam curing method or the like is usable. As a material used for a front surface of the synthetic resin laminate, a material having a pencil hardness of higher than or equal to 2H or a steel wool hardness of higher than or equal to 2 is preferable among the above-listed materials. An acrylic or silicon-based material, for example, is preferable. An acrylic material is especially preferable because of the balance between the processability and the hardness.

There is no specific limitation on the method for applying a hard-coat applicable to the present invention, and any known method is usable. Usable methods include, for example, a spin coating method, a dipping method, a spray method, a slide coating method, a bar coating method, a roll coating method, a gravure coating method, a meniscus coating method, a flexography printing method, a screen printing method, a bead coating method, and a brush method, and the like.

For the purpose of improving the adherence of the hard-coat, the surface to be hard-coated may be treated. Usable methods for the treatment include, for example, known methods such as a sandblast method, a solvent treatment method, a corona discharge treatment method, a chromic acid treatment method, a flame treatment method, a hot air treatment method, an ozone treatment method, an ultraviolet treatment method, a primer treatment method by use of a resin composition, and the like.

The hard-coat layer may be formed on both of the two surfaces of the synthetic resin laminate. For a front surface, a material that is hard and can be easily wiped out is used. For a rear surface, a material having a function of, for example, preventing the synthetic resin laminate from being scratched while being handled or providing post-processability, for example, suitability to printing is selected. The materials used for the front surface and the rear surface are changed when necessary.

A usable acrylic compound may be a crosslinked polymer compound including at least two (meth)acryloyloxy groups ("(meth)acryloyloxy group" refers to acryloyloxy group and/or methacryloyloxy group) in a molecule. A residue that bonds the (meth)acryloyloxy groups may be hydrocarbon or a derivative thereof, and the molecule may include an ether bond, a thioether bond, an ester bond, an amide bond, a urethane bond or the like.

A usable silicon-based compound may be a thermosetting polyorganosiloxane composition containing an ultraviolet absorber or the like when necessary. A usable polyorganosiloxane is, for example, a hydrolysis product and/or a partial condensation product obtained by performing hydrolysis or condensation on a common organosiloxane represented by general formula $R^1{}_n Si(OR^2)_{4-n}$.

In the hard-coat treatment in the present invention, a hard-coat that is curable by thermal energy and/or optical energy may be used to form a hard-coat layer. The hard-coat that is curable by thermal energy may be, for example, a polyorganosiloxane-based thermosetting resin composition or a crosslinked acrylic thermosetting resin composition. The hard-coat that is curable by optical energy may be, for example, a photocurable resin composition obtained by adding a photoinitiator to a resin composition formed of a mono-functional and/or multi-functional acrylate monomer and/or oligomer.

It is preferable that the materials of the resin layer including the resin (A), the substrate layer including the polycarbonate-based resin (B), and the hard-coat according to the present invention are purified by filtration. In the case where the synthetic resin laminate is produced, or in the case where the layers of the synthetic resin laminate are laminated, after the materials are filtered, the synthetic resin laminate has less faults in the external appearance such as presence of foreign objects or defects. There is no specific limitation on the filtration method. Usable filtration methods include, for example, a melt filtration method, a solution filtration method, and a combination thereof.

There is no specific limitation on the filter to be used. Any known filter is usable. The type of filter is appropriately selected in accordance with the temperature of use, the viscosity or the filtration precision of the materials. There is no specific limitation on the material of the filter. Usable materials include, for example, non-woven cloth or roll of roving yarn of polypropylene, cotton, polyester, viscose rayon or glass fiber, phenyl resin-impregnated cellulose, metal fiber non-woven cloth sintered body, metal powder sintered body, metal fiber woven body, a combination thereof, and the like. In consideration of the thermal resistance, the durability and the pressure resistance, a material obtained by sintering metal fiber non-woven cloth is preferable.

The filtration precision for the resin (A) and the polycarbonate-based resin (B) is less than or equal to 50 μm, preferably less than or equal to 30 μm, and more preferably less than or equal to 10 μm. The filtration precision for the hard-coat, which is applied to the outermost surface of the synthetic resin laminate, is less than or equal to 20 μm, preferably less than or equal to 10 μm, and more preferably less than or equal to 5 μm.

For performing filtration for the resin (A) and the polycarbonate-based resin (B), it is preferable to use, for example, a polymer filter that is used for solution filtration of a thermoplastic resin. Polymer filters are classified by structure into a leaf disc filter, a candle filter, a pack disc filter, a cylindrical filter and the like. A leaf disc filter, which has a large effective filtration area, is especially preferable.

The synthetic resin laminate according to the present invention can have one of, or both of, the two surfaces thereof be subjected to at least one of a reflection preventive treatment, an antifouling treatment, an antistatic treatment, a climate-proof treatment, and an anti-glare treatment. There is no specific limitation on the method for the reflection preventive treatment, the antifouling treatment, the antistatic treatment, the climate-proof treatment, or the anti-glare treatment. Any known method is usable. Usable methods include, for example, a method of applying a reflection reducing coat, a method of vapor-depositing a dielectric thin film, a method of applying an antistatic coat, and the like.

<Printing Layer>

The synthetic resin laminate according to the present invention may have a printing layer (design layer) on one surface of the laminate. Methods for forming the printing layer include a method of printing a desired design directly on the synthetic resin laminate by gravure printing, flexography printing or the like, and heating and thus drying the printing to form the printing layer; and a method of forming, by printing, a printing layer on a transfer sheet such as biaxially stretched PET film or the like, and then transferring the printing layer on a multi-layer sheet by thermal transfer or the like. Printing may be performed by use of, for example, polyester-based, polycarbonate-based, acrylic, or urethane-based printing ink. Specifically, in the case where there is a problem regarding the adherence of the printing layer with the hard-coat layer, the surface of the printing layer can be modified by a surface treatment such as plasma etching, ion etching, corona discharge or the like to improve the adherence. Alternatively, physical vapor deposition or chemical vapor deposition may be used to form a metal layer, a metal oxide layer or the like as a printing layer on the synthetic resin laminate.

The printing layer may be laminated directly on the synthetic resin laminate. In order to improve the adherence between the printing layer and the synthetic resin laminate, a primer layer may be provided between the printing layer and the synthetic resin laminate. The primer layer can be formed by applying any known primer agent to the synthetic resin laminate.

Alternatively, the printing layer may be formed on the substrate layer of the synthetic resin laminate according to the present invention, and a hard-coat layer may be formed on the resin layer of the synthetic resin laminate to form a hard-coat sheet. The hard-coat sheet may be two-dimensionally bent under heating and pressurization to form a molded body.

Still alternatively, the printing layer may be formed on the substrate layer of the synthetic resin laminate according to the present invention, and a hard-coat layer may be formed on the resin layer of the synthetic resin laminate to form a hard-coat sheet. The hard-coat sheet may be pressure-formed under heating and pressurization to form a three-dimensional molded body.

The synthetic resin laminate according to the present invention may further have a thermoplastic resin film provided on the printing layer in order to improve the processability, design or the like of a decorative molded body which is formed by use of the synthetic resin laminate. A material for the thermoplastic resin film may be optionally selected in accordance with the material of the molded body which is to be integrated with the decorative film. Usable materials include, for example, polystyrene-based resins such as polycarbonate resin, ABS resin, PVC resin, impact-resistant polystyrene resin and the like; polypropylene-based resin; acrylic resin; urethane resin; polyester-based resin, silicone resin; and a mixture of two or more thereof; and the like.

The thermoplastic resin film may be laminated directly on the printing layer or may be laminated with an adhesive being interposed between the printing layer and the thermoplastic resin film.

<In-Molded Body>

An in-molded body according to the present invention is a molded body obtained by integration of a resin molded body and a synthetic resin laminate according to the present invention. The resin molded body is provided on the design surface of the synthetic resin laminate. A material of the resin molded body may be optionally selected from known thermoplastic resins. Usable materials include, for example, polystyrene-based resins such as polycarbonate resin, ABS resin, PVC resin, impact-resistant polystyrene resin and the like; polypropylene-based resin; acrylic resin; urethane resin; polyester-based resin, silicone resin; and a mixture of two or more thereof; and the like.

For integrating the synthetic resin laminate and the resin molded body, any of the following methods, for example, is usable. According to one exemplary method, the synthetic resin laminate is inserted into a mold for injection molding without being preliminarily molded, and a melted resin is injected into the mold, so that an injection-molded body is formed and at the same time, the synthetic resin laminate is bonded to the molded body. According to another exemplary the method, the synthetic resin laminate is preliminarily molded by thermoforming (vacuum forming, air-pressure forming, vacuum-pressure forming, etc.) and set in a mold for injection molding, and a melted resin is injected into the mold, so that an injection-molded body is formed and at the same time, the molded body is integrated with the preliminarily molded synthetic resin laminate. Still another exemplary method is a three-dimensional surface-decorative molding method, by which a surface of the resin molded body is covered with the synthetic resin laminate to form an integral body. The printing layer may be formed on one surface of the synthetic resin laminate according to the present invention and the synthetic resin laminate and the printing layer may be thermoformed, while a lining layer may be formed of a melted resin on the printing layer by injection molding.

EXAMPLES

Hereinafter, the present invention will be specifically described by way of examples. The present invention is not limited to these examples in any way.

The properties of laminate resins obtained in production examples were measured as follows, and synthetic resin laminates obtained in examples and comparative examples were evaluated as follows.

<Weight-Average Molecular Weight>

Standard polystyrene was dissolved in chloroform and the weight-average molecular weight thereof was measured by gel permeation chromatography (GPC) in advance. The resultant standard curve was used as the reference. The weight-average molecular weight of each of acrylic resins and polycarbonate resins was measured by GPC in substantially the same manner. A GPC device used was as follows.

Device: Wates 2609
Column: Shodex GPC KF-805L; 8φ×300 mm; two coupled columns
Developing solvent: chloroform
Flow rate: 1 ml/min.
Temperature: 30° C.
Detector: UV . . . 486 nm polycarbonate, aromatic polyester
RI . . . special acrylic resin <Pencil Hardness Test>

In conformity with JIS K 5600-5-4, a pencil was pressed to a surface of each synthetic resin laminate at an angle of 45 degrees with respect to the surface and at a load of 750 g. The hardness of the pencil was gradually increased. The maximum hardness of the pencil which did not leave a scratch was set as the pencil hardness. The synthetic resin laminate was evaluated as being good when the pencil hardness was H or higher.

<Glass Transition Temperature Measurement>

After each synthetic resin laminate was kept at 25° C. for 1 minute under a nitrogen atmosphere, the measurement was performed by use of a differential scanning calorimeter Pyris 1 produced by Perkin Elmer while the temperature was raised at a rate of 10° C./min. The intersection of two tangential lines drawn to a DSC curve obtained by a tangent method was set as the glass transition temperature.

<Moldability>

Each of the synthetic resin laminates obtained in examples and comparative examples was cut into sheets having a size of 200 mm×300 mm and having each of various thicknesses. The resultant sample sheets were each pre-heated to 160° C. by an infrared heater and pressure-formed into a mold (cubic mold) by high-pressure air of 5 MPa. The drawing height was obtained by use of a mold having a height of 5 mm to evaluate moldability of the resultant sample sheets.

The surface state (cracks, wrinkles, unevenness, shape) of the molded body was observed, and the shape was adjusted. When none of cracks, wrinkles, unevenness, breakages and ruptures was observed, the molded body was evaluated as "Excellent". By contrast, when any of shape adjustment flaws, cracks, wrinkles, unevenness, breakages, ruptures was observed, the molded body was evaluated as "Bad".

<Thermal Resistance>

Each of the synthetic resin laminates, including a high-hardness layer and a hard-coat layer provided on a surface of the high-hardness layer, obtained in examples and comparative examples was cut into sheets having a size of 100 mm×100 mm and having each of various thicknesses. The resultant sample sheets were each put into a hot air drier heated to 125° C. and kept therein for 12 minutes to perform a thermal resistance test. The surface of the resultant hard-coat layer was observed. When no crack was observed, the sample sheet was evaluated as "Excellent". By contrast, when a crack was observed, the sample sheet was evaluated as "Bad".

<External Film Appearance>

Each of the films obtained in examples and comparative examples was inclined at 45 degrees with respect to a fluorescent lamp, and the external film appearance was visually observed. When no lamination flaw was observed, the sample sheet was evaluated as "Excellent". By contrast, when a lamination flaw was observed, the sample sheet was evaluated as "Bad". A "lamination flaw" refers to a disturbance at the interface of lamination, and is called a "flaw mark" or "stripe flaw".

Synthesis Example 1

Synthesis of 2,2-bis(4-hydroxy-3-methylphenyl) propane/2,2-bis(4-hydroxyphenyl)propane=6/4 copolymer polycarbonate 6174.7 g (24.12 mol) of 2,2-bis(4-hydroxy-3-methylphenyl)propane (produced by Honshu Chemical Industry Co., Ltd.), 4086 g (17.98 mol) of 2,2-bis(4-hydroxyphenyl)propane (produced by Nippon Steel Chemical Co., Ltd.), 3.8 g of triethylbenzylammoniumchloride, and 50.0 g of hydrosulfite were dissolved in 54.5 L of 9.0 w/w % aqueous solution of sodium hydroxide.

24 L of methylene chloride was added thereto and stirred, and then 5390 g of phosgene was blown thereinto over 40 minutes while the temperature was kept at 15° C.

After the blowing of phosgene was finished, 210 g of p-t-butylphenol was added thereto and stirred vigorously to emulsify the reaction solution. After the emulsion, 110 ml of triethylamine was added thereto and stirred at a temperature of 20 to 25° C. for about 1 hour to cause polymerization.

After the polymerization was finished, the reaction solution was divided into a water phase and an organic phase, and the organic phase was neutralized with phosphoric acid. The organic phase was repeatedly washed with water until the conductivity of the washing water reached 10 μS/cm or lower. The resultant organic phase was dripped into warm water kept at 62° C., and the solvent was vaporized and thus removed to obtain a powdery white precipitate. The obtained precipitate was filtrated and dried at a temperature of 120° C. for 24 hours to obtain an intended powdery polycarbonate polymer. The weight-average molecular weight of the obtained polycarbonate resin (a2) was 31,000 (glass transition temperature: 136° C.).

Production Example 1

Production of Resin (a11) Pellet

40% by mass of Metablen H-880 (produced by Mitsubishi Rayon Co., Ltd.; weight-average molecular weight: 14,000; a11/a12=33/66) as the (meth)acrylate copolymer (a1) and 60% by mass of the polycarbonate resin (a2) produced in synthesis example 1 were put into, and mixed by, a blender for 20 minutes, melt-kneaded at a cylinder temperature of 260° C. by use of a biaxial extruder having a screw diameter of 35 mm, extruded into a strand, and formed into a pellet by a pelletizer. The pellet was stably produced. The glass transition temperature of the resultant high-hardness resin composition was measured and found to have a single peak at 119° C. Based on this, it was confirmed that the components of the resin composition were in a compatible state.

Production Example 2

Production of Resin (A12) Pellet

30% by mass of the (meth)acrylate copolymer used in production example 1 and 70% by mass of the polycarbonate resin (a2) produced in synthesis example 1 were mixed and pelletized. The pelletization was performed under substantially the same conditions as those in production example 1. The pellet was stably produced. The glass transition temperature of the resultant resin composition was measured and found to have a single peak at 124° C. Based on this, it was confirmed that the components of the resin composition were in a compatible state.

Production Example 3

Production of Resin (A13) Pellet

40% by mass of the (meth)acrylate copolymer used in production example 1 and 60% by mass of aromatic polycarbonate (Iupilon E-2000 produced by Mitsubishi Engineering-Plastics Corporation; Tg: 150° C.) were mixed and pelletized. The pelletization was performed under substantially the same conditions as those in production example 1. The pellet was stably produced. The glass transition temperature of the resultant resin composition was measured and found to have a single peak at 123° C. Based on this, it was confirmed that the components of the resin composition were in a compatible state.

Production Example 4

Production of Resin (B11) Pellet

70% by mass of aromatic polycarbonate (Iupilon E-2000 produced by Mitsubishi Engineering-Plastics Corporation; Tg: 150° C.) as the polycarbonate-based resin (B) and 30% by mass of polycyclohexanedimethyleneterephthalate resin (low-crystallinity copolymer polyester having a structure obtained as a result of 65 mol % of ethyleneglycol in PCTG DN001 PET produced by EASTMAN being substituted with 1,4-CHDM; Tg: 84° C.) were put into, and mixed by, a blender for 20 minutes, melt-kneaded at a cylinder temperature of 260° C. by use of a biaxial extruder having a screw diameter of 35 mm, extruded into a strand, and formed into a pellet by a pelletizer. The pellet was stably produced. The glass transition temperature of the resultant polycarbonate-based resin composition was measured and found to have a single peak at 121° C. Based on this, it was confirmed that the components of the resin composition were in a compatible state.

Production Example 5

Production of Resin (B12) Pellet

60% by mass of aromatic polycarbonate (Iupilon E-2000 produced by Mitsubishi Engineering-Plastics Corporation; Tg: 150° C.) as the polycarbonate-based resin (B) and 40% by mass of polycyclohexanedimethyleneterephthalate resin (low-crystallinity copolymer polyester having a structure obtained as a result of 65 mol % of ethyleneglycol in PCTG DN001 PET produced by EASTMAN being substituted with 1,4-CHDM; Tg: 84° C.) were put into, and mixed by, a blender for 20 minutes, melt-kneaded at a cylinder temperature of 260° C. by use of a biaxial extruder having a screw diameter of 35 mm, extruded into a strand, and formed into a pellet by a pelletizer. The pellet was stably produced. The glass transition temperature of the resultant polycarbonate-based resin composition was measured and found to have a single peak at 115° C. Based on this, it was confirmed that the components of the resin composition were in a compatible state.

Production Example 6

Production of Resin (B21) Pellet

40% by mass of aromatic polycarbonate (Iupilon E-2000 produced by Mitsubishi Engineering-Plastics Corporation; Tg: 150° C.) as the polycarbonate-based resin (B) and 60% by mass of polycyclohexanedimethyleneterephthalate resin (low-crystallinity copolymer polyester having a structure obtained as a result of 65 mol % of ethyleneglycol in PCTG DN001 PET produced by EASTMAN being substituted with 1,4-CHDM; Tg: 84° C.) were put into, and mixed by, a blender for 20 minutes, melt-kneaded at a cylinder temperature of 260° C. by use of a biaxial extruder having a screw diameter of 35 mm, extruded into a strand, and formed into a pellet by a pelletizer. The pellet was stably produced. The glass transition temperature of the resultant polycarbonate-based resin composition was measured and found to have a single peak at 105° C. Based on this, it was confirmed that the components of the resin composition were in a compatible state.

Production Example 7

Production of Resin (A21) Pellet

Only the polycarbonate (a2) produced in synthesis example 1 was used as the material and pelletized in substantially the same manner as in production example 1. The pellet was stably produced.

Production Example 8

Production of Resin (A22) Pellet

10% by mass of Metablen H-880 (produced by Mitsubishi Rayon Co., Ltd.; weight-average molecular weight: 14,000; a11/a12=33/66) as the (meth)acrylate copolymer (a1) and 90% by mass of the polycarbonate polymer produced in synthesis example 1 were put into, and mixed by, a blender for 20 minutes, melt-kneaded at a cylinder temperature of 260° C. by use of a biaxial extruder having a screw diameter of 35 mm, extruded into a strand, and formed into a pellet by a pelletizer. The pellet was stably produced. The glass transition temperature of the resultant resin composition was measured and found to have a single peak at 129° C. Based on this, it was confirmed that the components of the resin composition were in a compatible state.

Production Example 9

Production of Resin (A23) Pellet

10% by mass of Metablen H-880 (produced by Mitsubishi Rayon Co., Ltd.; weight-average molecular weight: 14,000; a11/a12=33/66) as the (meth)acrylate copolymer (a1) and 90% by mass of aromatic polycarbonate (Iupilon E-2000 produced by Mitsubishi Engineering-Plastics Corporation; Tg: 150° C.) were put into, and mixed by, a blender for 20 minutes, melt-kneaded at a cylinder temperature of 260° C. by use of a biaxial extruder having a screw diameter of 35 mm, extruded into a strand, and formed into a pellet by a pelletizer. The pellet was stably produced. The glass transition temperature of the resultant resin composition was measured and found to have a single peak at 144° C. Based on this, it was confirmed that the components of the resin composition were in a compatible state.

Example 1

A synthetic resin laminate was produced by molding by use of a multi-layer extrusion device including a monoaxial extruder having a shaft diameter of 40 mm, a monoaxial extruder having a shaft diameter of 75 mm, and a multi-manifold die coupled to the extruders. The resin (A11) obtained in production example 1 was continuously introduced into the monoaxial extruder having a shaft diameter of 40 mm and extruded under the conditions of a cylinder temperature of 240° C. and a dispensing rate of 8.0 kg/h. The resin (B11) obtained in production example 4 was continuously introduced into the monoaxial extruder having a shaft diameter of 75 mm and extruded under the conditions of a cylinder temperature of 260° C. and a dispensing rate of 59.0 kg/h. The resins extruded from the extruders were laminated in the multi-manifold and extruded from the T-die in the form of a sheet. Three mirror-finish rolls respectively having temperatures of 120° C., 120° C. and 140° C. from the upstream side were provided. The sheet was cooled while the mirror surfaces of the mirror-finish rolls were transferred thereto. As a result, a laminate (C11) of the (A11) and the (B11) was obtained. The obtained laminate had a total thickness of 0.5 mm, and the (A11) layer had a thickness of 60 μm in a central part thereof. The result of the pencil scratch hardness test was 2H. The moldability, the thermal resistance, and the external film appearance were all evaluated as good, namely, "Excellent".

Example 2

A UV-curable acrylic hard-coat solution diluted by a solvent was applied to the high-hardness layer formed of the (A11) of the laminate (C11) obtained in example 1 by use of a bar coater such that the post-curing thickness of the hard-coat would be 3 to 8 μm. After the solvent was dried, the resultant substance was irradiated and thus cured with ultraviolet rays under the condition of a line speed of 1.5 m/min. by use of a conveyor equipped with a high voltage mercury lamp located at a distance of 12 cm from the resultant substance and having an output of 80 W/cm. As a result, a laminate (D11) including the high-hardness layer and the hard-coat layer provided on the high-hardness layer was obtained. The result of the pencil scratch hardness test was 3H. The moldability, the thermal resistance, and the external film appearance were all evaluated as good, namely, "Excellent".

Example 3

A synthetic resin laminate was produced by molding by use of a multi-layer extrusion device including a monoaxial extruder having a shaft diameter of 40 mm, a monoaxial extruder having a shaft diameter of 75 mm, and a multi-manifold die coupled to the extruders. The resin (A12) obtained in production example 2 was continuously introduced into the monoaxial extruder having a shaft diameter of 40 mm and extruded under the conditions of a cylinder temperature of 240° C. and a dispensing rate of 8.0 kg/h. The resin (B11) obtained in production example 4 was continuously introduced into the monoaxial extruder having a shaft diameter of 75 mm and extruded under the conditions of a cylinder temperature of 260° C. and a dispensing rate of 59.0 kg/h. The resins extruded from the extruders were laminated in the multi-manifold and extruded from the T-die in the form of a sheet. Three mirror-finish rolls respectively having temperatures of 120° C., 120° C. and 140° C. from the upstream side were provided. The sheet was cooled while the mirror surfaces of the mirror-finish rolls were transferred thereto. As a result, a laminate (C12) of the (A12) and the (B11) was obtained. The obtained laminate had a total thickness of 0.5 mm, and the (A12) layer had a thickness of 60 μm in a central part thereof. The result of the pencil scratch hardness test was 2H. The moldability, the thermal resistance, and the external film appearance were all evaluated as good, namely, "Excellent".

Example 4

A UV-curable acrylic hard-coat solution diluted by a solvent was applied to the high-hardness layer formed of the (A12) of the laminate (C12) obtained in example 3 by use of a bar coater such that the post-curing thickness of the hard-coat would be 3 to 8 μm. After the solvent was dried, the resultant substance was irradiated and thus cured with ultraviolet rays under the condition of a line speed of 1.5 m/min. by use of a conveyor equipped with a high voltage mercury lamp located at a distance of 12 cm from the resultant substance and having an output of 80 W/cm. As a result, a laminate (D12) including the high-hardness layer and the hard-coat layer provided on the high-hardness layer was obtained. The result of the pencil scratch hardness test was 3H. The moldability, the thermal resistance, and the external film appearance were all evaluated as good, namely, "Excellent".

Example 5

A synthetic resin laminate was produced by molding by use of a multi-layer extrusion device including a monoaxial extruder having a shaft diameter of 40 mm, a monoaxial extruder having a shaft diameter of 75 mm, and a multi-manifold die coupled to the extruders. The resin (A13) obtained in production example 3 was continuously introduced into the monoaxial extruder having a shaft diameter of 40 mm and extruded under the conditions of a cylinder temperature of 240° C. and a dispensing rate of 8.0 kg/h. The resin (B11) obtained in production example 4 was continuously introduced into the monoaxial extruder having a shaft diameter of 75 mm and extruded under the conditions of a cylinder temperature of 260° C. and a dispensing rate of 59.0 kg/h. The resins extruded from the extruders were laminated in the multi-manifold and extruded from the T-die in the form of a sheet. Three mirror-finish rolls respectively having temperatures of 120° C., 120° C. and 140° C. from the upstream side were provided. The sheet was cooled while the mirror surfaces of the mirror-finish rolls were transferred thereto. As a result, a laminate (C13) of the (A13) and the (B11) was obtained. The obtained laminate had a total thickness of 0.5 mm, and the (A12) layer had a thickness of 60 μm in a central part thereof. The result of the pencil scratch hardness test was 2H. The moldability, the thermal resistance, and the external film appearance were all evaluated as good, namely, "Excellent".

Example 6

A UV-curable acrylic hard-coat solution diluted by a solvent was applied to the high-hardness layer formed of the (A13) of the laminate (C13) obtained in example 5 by use of a bar coater such that the post-curing thickness of the hard-coat would be 3 to 8 μm. After the solvent was dried, the resultant substance was irradiated and thus cured with ultraviolet rays under the condition of a line speed of 1.5 m/min. by use of a conveyor equipped with a high voltage mercury lamp located at a distance of 12 cm from the resultant substance and having an output of 80 W/cm. As a result, a laminate (D13) including the high-hardness layer and the hard-coat layer provided on the high-hardness layer was obtained. The result of the pencil scratch hardness test was 3H. The moldability, the thermal resistance, and the external film appearance were all evaluated as good, namely, "Excellent".

Example 7

The resin (B12) was used instead of the resin (B11). Except for this, substantially the same procedure as in example 1 was performed to obtain a laminate (C14) of the (A11) and the (B12). The obtained laminate had a total thickness of 0.5 mm, and the (A11) high-hardness layer had a thickness of 60 μm in a central part thereof. The result of the pencil scratch hardness test was 2H. The moldability, the thermal resistance, and the external film appearance were all evaluated as good, namely, "Excellent".

Example 8

A UV-curable acrylic hard-coat solution diluted by a solvent was applied to the high-hardness layer formed of the (A11) of the laminate (C14) obtained in example 7 by use of a bar coater such that the post-curing thickness of the hard-coat would be 3 to 8 μm. After the solvent was dried, the resultant substance was irradiated and thus cured with ultraviolet rays under the condition of a line speed of 1.5 m/min. by use of a conveyor equipped with a high voltage mercury lamp located at a distance of 12 cm from the resultant substance and having an output of 80 W/cm. As a result, a laminate (D14) including the high-hardness layer and the hard-coat layer provided on the high-hardness layer was obtained. The result of the pencil scratch hardness test was 3H. The moldability, the thermal resistance, and the external film appearance were all evaluated as good, namely, "Excellent".

Example 9

A synthetic resin laminate was produced by molding by use of a multi-layer extrusion device including a monoaxial extruder having a shaft diameter of 40 mm, a monoaxial extruder having a shaft diameter of 75 mm, and a multi-manifold die coupled to the extruders. The resin (A11) obtained in production example 1 was continuously introduced into the monoaxial extruder having a shaft diameter of 40 mm and extruded under the conditions of a cylinder temperature of 240° C. and a dispensing rate of 14.0 kg/h. The resin (B11) obtained in production example 4 was continuously introduced into the monoaxial extruder having a shaft diameter of 75 mm and extruded under the conditions of a cylinder temperature of 260° C. and a dispensing rate of 16.0 kg/h. The resins extruded from the extruders were laminated in the multi-manifold and extruded from the T-die in the form of a sheet. Three mirror-finish rolls respectively having temperatures of 120° C., 120° C. and 140° C. from the upstream side were provided. The sheet was cooled while the mirror surfaces of the mirror-finish rolls were transferred thereto. As a result, a laminate (C15) of the (A11) and the (B11) was obtained. The obtained laminate had a total thickness of 0.125 mm, and the (A11) layer had a thickness of 60 μm in a central part thereof. The result of the pencil scratch hardness test was H. The moldability, the thermal resistance, and the external film appearance were all evaluated as good, namely, "Excellent".

Example 10

A UV-curable acrylic hard-coat solution diluted by a solvent was applied to the high-hardness layer formed of the (A11) of the laminate (C15) obtained in example 9 by use of a bar coater such that the post-curing thickness of the hard-coat would be 3 to 8 μm. After the solvent was dried, the resultant substance was irradiated and thus cured with ultraviolet rays under the condition of a line speed of 1.5 m/min. by use of a conveyor equipped with a high voltage mercury lamp located at a distance of 12 cm from the resultant substance and having an output of 80 W/cm. As a result, a laminate (D15) including the high-hardness layer and the hard-coat layer provided on the high-hardness layer was obtained. The result of the pencil scratch hardness test was 2H. The moldability, the thermal resistance, and the external film appearance were all evaluated as good, namely, "Excellent".

Example 11

A synthetic resin laminate was produced by molding by use of a multi-layer extrusion device including a monoaxial extruder having a shaft diameter of 40 mm, a monoaxial extruder having a shaft diameter of 75 mm, and a multi-manifold die coupled to the extruders. The resin (A12) obtained in production example 2 was continuously introduced into the monoaxial extruder having a shaft diameter of 40 mm and extruded under the conditions of a cylinder temperature of 240° C. and a dispensing rate of 14.0 kg/h.

The resin (B11) obtained in production example 4 was continuously introduced into the monoaxial extruder having a shaft diameter of 75 mm and extruded under the conditions of a cylinder temperature of 260° C. and a dispensing rate of 16.0 kg/h. The resins extruded from the extruders were laminated in the multi-manifold and extruded from the T-die in the form of a sheet. Three mirror-finish rolls respectively having temperatures of 120° C., 120° C. and 140° C. from the upstream side were provided. The sheet was cooled while the mirror surfaces of the mirror-finish rolls were transferred thereto. As a result, a laminate (C16) of the (A12) and the (B11) was obtained. The obtained laminate had a total thickness of 0.125 mm, and the (A12) layer had a thickness of 60 μm in a central part thereof. The result of the pencil scratch hardness test was H. The moldability, the thermal resistance, and the external film appearance were all evaluated as good, namely, "Excellent".

Example 12

A UV-curable acrylic hard-coat solution diluted by a solvent was applied to the high-hardness layer formed of the (A12) of the laminate (C16) obtained in example 11 by use of a bar coater such that the post-curing thickness of the hard-coat would be 3 to 8 μm. After the solvent was dried, the resultant substance was irradiated and thus cured with ultraviolet rays under the condition of a line speed of 1.5 m/min. by use of a conveyor equipped with a high voltage mercury lamp located at a distance of 12 cm from the resultant substance and having an output of 80 W/cm. As a result, a laminate (D16) including the high-hardness layer and the hard-coat layer provided on the high-hardness layer was obtained. The result of the pencil scratch hardness test was 2H. The moldability, the thermal resistance, and the external film appearance were all evaluated as good, namely, "Excellent".

Example 13

A synthetic resin laminate was produced by molding by use of a multi-layer extrusion device including a monoaxial extruder having a shaft diameter of 40 mm, a monoaxial extruder having a shaft diameter of 75 mm, and a multi-manifold die coupled to the extruders. The resin (A13) obtained in production example 3 was continuously introduced into the monoaxial extruder having a shaft diameter of 40 mm and extruded under the conditions of a cylinder temperature of 240° C. and a dispensing rate of 14.0 kg/h. The resin (B11) obtained in production example 4 was continuously introduced into the monoaxial extruder having a shaft diameter of 75 mm and extruded under the conditions of a cylinder temperature of 260° C. and a dispensing rate of 16.0 kg/h. The resins extruded from the extruders were laminated in the multi-manifold and extruded from the T-die in the form of a sheet. Three mirror-finish rolls respectively having temperatures of 120° C., 120° C. and 140° C. from the upstream side were provided. The sheet was cooled while the mirror surfaces of the mirror-finish rolls were transferred thereto. As a result, a laminate (C17) of the (A13) and the (B11) was obtained. The obtained laminate had a total thickness of 0.125 mm, and the (A13) layer had a thickness of 60 μm in a central part thereof. The result of the pencil scratch hardness test was H. The moldability, the thermal resistance, and the external film appearance were all evaluated as good, namely, "Excellent".

Example 14

A UV-curable acrylic hard-coat solution diluted by a solvent was applied to the high-hardness layer formed of the (A13) of the laminate (C17) obtained in example 13 by use of a bar coater such that the post-curing thickness of the hard-coat would be 3 to 8 After the solvent was dried, the resultant substance was irradiated and thus cured with ultraviolet rays under the condition of a line speed of 1.5 m/min. by use of a conveyor equipped with a high voltage mercury lamp located at a distance of 12 cm from the resultant substance and having an output of 80 W/cm. As a result, a laminate (D17) including the high-hardness layer and the hard-coat layer provided on the high-hardness layer was obtained. The result of the pencil scratch hardness test was 2H. The moldability, the thermal resistance, and the external film appearance were all evaluated as good, namely, "Excellent".

Example 15

The resin (B12) was used instead of the resin (B11). Except for this, substantially the same procedure as in example 9 was performed to obtain a laminate (C18) of the (A11) and the (B12). The obtained laminate had a total thickness of 0.125 mm, and the (A11) high-hardness layer had a thickness of 60 μm in a central part thereof. The result of the pencil scratch hardness test was H. The moldability, the thermal resistance, and the external film appearance were all evaluated as good, namely, "Excellent".

Example 16

A UV-curable acrylic hard-coat solution diluted by a solvent was applied to the high-hardness layer formed of the (A11) of the laminate (C18) obtained in example 15 by use of a bar coater such that the post-curing thickness of the hard-coat would be 3 to 8 μm. After the solvent was dried, the resultant substance was irradiated and thus cured with ultraviolet rays under the condition of a line speed of 1.5 m/min. by use of a conveyor equipped with a high voltage mercury lamp located at a distance of 12 cm from the resultant substance and having an output of 80 W/cm. As a result, a laminate (D18) including the high-hardness layer and the hard-coat layer provided on the high-hardness layer was obtained. The result of the pencil scratch hardness test was 2H. The moldability, the thermal resistance, and the external film appearance were all evaluated as good, namely, "Excellent".

Example 17

A synthetic resin laminate was produced by molding by use of a multi-layer extrusion device including a monoaxial extruder having a shaft diameter of 40 mm, a monoaxial extruder having a shaft diameter of 75 mm, and a multi-manifold die coupled to the extruders. The resin (A11) obtained in production example 1 was continuously introduced into the monoaxial extruder having a shaft diameter of 40 mm and extruded under the conditions of a cylinder temperature of 240° C. and a dispensing rate of 4.0 kg/h. The resin (B11) obtained in production example 4 was continuously introduced into the monoaxial extruder having a shaft diameter of 75 mm and extruded under the conditions of a cylinder temperature of 260° C. and a dispensing rate of 63.0 kg/h. The resins extruded from the extruders were laminated in the multi-manifold and extruded from the T-die in the form of a sheet. Three mirror-finish rolls respectively having temperatures of 120° C., 120° C. and 140° C. from the upstream side were provided. The sheet was cooled while the mirror surfaces of the mirror-finish rolls were transferred thereto. As a result, a laminate (C19) of the (A11) and the (B11) was obtained. The obtained laminate had a total thickness of 1 mm, and the (A11) layer had a thickness of 60 μm in a central part thereof. The result of the pencil scratch hardness test was 2H. The moldability, the thermal resistance, and the external film appearance were all evaluated as good, namely, "Excellent".

Comparative Example 1

The resin (A21) was used instead of the resin (A11). Except for this, substantially the same procedure as in example 1 was performed to obtain a laminate (E11) of the (A21) and the (B11). The obtained laminate had a total thickness of 0.5 mm, and the (A21) high-hardness layer had a thickness of 60 μm in a central part thereof. The result of the pencil scratch hardness test was F. The moldability, the thermal resistance, and the external film appearance were all evaluated as good, namely, "Excellent".

Comparative Example 2

An aromatic polycarbonate (Iupilon S-2000 produced by Mitsubishi Engineering-Plastics Corporation; Tg: 145° C.) resin (B15) was used instead of the resin (B11). Except for this, substantially the same procedure as in example 1 was performed to obtain a laminate (E12) of the (A11) and the (B15). The obtained laminate had a total thickness of 0.5 mm, and the (A11) high-hardness layer had a thickness of 60 μm in a central part thereof. The result of the pencil scratch hardness test was 2H. The moldability was evaluated as "Bad" because the shape was not well adjusted and wrinkles were generated. The thermal resistance and the external film appearance were evaluated as good, namely, "Excellent".

Comparative Example 3

A polymethylmethacrylate resin (A24) (trade name: ALTUGLAS V020 produced by ARKEMA) was used instead of the resin (A11), and the aromatic polycarbonate (Iupilon S-2000 produced by Mitsubishi Engineering-Plastics Corporation; Tg: 145° C.) resin (B15) was used instead of the resin (B11). The temperatures of the rolls were 130° C., 130° C. and 190° C. Except for these, substantially the same procedure as in example 1 was performed to obtain a laminate (E13) of the (A24) and the (B15). The obtained laminate had a total thickness of 0.5 mm, and the (A24) high-hardness layer had a thickness of 60 μm in a central part thereof. The result of the pencil scratch hardness test was 3H. The moldability was evaluated as "Bad" because the shape was not good and wrinkles were generated. The thermal resistance and the external film appearance were both evaluated as good, namely, "Excellent".

Comparative Example 4

The polymethylmethacrylate resin (A24) (trade name: ALTUGLAS V020 produced by ARKEMA) was used instead of the resin (A11), and the aromatic polycarbonate (Iupilon S-2000 produced by Mitsubishi Engineering-Plastics Corporation; Tg: 145° C.) resin (B15) was used instead of the resin (B11). The temperatures of the rolls were 130° C., 130° C. and 140° C. Except for these, substantially the same procedure as in example 1 was performed to obtain a laminate (E14) of the (A24) and the (B15). The obtained laminate had a total thickness of 0.125 mm, and the (A24) high-hardness layer had a thickness of 60 μm in a central part thereof. The result of the pencil scratch hardness test was 2H. The moldability was evaluated as "Bad" because wrinkles and breakages were generated. At the time of molding, ruptures were generated in a part of the laminate. The thermal resistance and the external film appearance were both evaluated as good, namely, "Excellent".

Comparative Example 5

A UV-curable acrylic hard-coat solution diluted by a solvent was applied to the high-hardness layer formed of the (A11) of the laminate (E12) obtained in comparative example 2 by use of a bar coater such that the post-curing thickness of the hard-coat would be 3 to 8 μm. After the solvent was dried, the resultant substance was irradiated and thus cured with ultraviolet rays under the condition of a line speed of 1.5 m/min. by use of a conveyor equipped with a high voltage mercury lamp located at a distance of 12 cm from the resultant substance and having an output of 80 W/cm. As a result, a laminate (F11) including the high-hardness layer and the hard-coat layer provided on the high-hardness layer was obtained. The result of the pencil scratch hardness test was 3H. The moldability was evaluated as "Bad" because the surface of the hard-coat layer was cracked. The thermal resistance was evaluated as "Bad" because cracks were generated. The external film appearance was evaluated as good, namely, "Excellent".

Comparative Example 6

A UV-curable acrylic hard-coat solution diluted by a solvent was applied to the high-hardness layer formed of the (A24) of the laminate (E13) obtained in comparative example 3 by use of a bar coater such that the post-curing thickness of the hard-coat would be 3 to 8 After the solvent was dried, the resultant substance was irradiated and thus cured with ultraviolet rays under the condition of a line speed of 1.5 m/min. by use of a conveyor equipped with a high voltage mercury lamp located at a distance of 12 cm from the resultant substance and having an output of 80 W/cm. As a result, a laminate (F12) including the high-hardness layer and the hard-coat layer provided on the high-hardness layer was obtained. The result of the pencil scratch hardness test was 4H. The moldability was evaluated as "Bad" because the surface of the hard-coat layer was cracked. The thermal resistance was evaluated as "Bad" because cracks were generated. The external film appearance was evaluated as good, namely, "Excellent".

Comparative Example 7

A UV-curable acrylic hard-coat solution diluted by a solvent was applied to the high-hardness layer formed of the (A24) of the laminate (E14) obtained in comparative example 4 by use of a bar coater such that the post-curing thickness of the hard-coat would be 3 to 8 μm. After the solvent was dried, the resultant substance was irradiated and thus cured with ultraviolet rays under the condition of a line speed of 1.5 m/min. by use of a conveyor equipped with a high voltage mercury lamp located at a distance of 12 cm from the resultant substance and having an output of 80 W/cm. As a result, a laminate (F13) including the high-hardness layer and the hard-coat layer provided on the high-hardness layer was obtained. The result of the pencil scratch hardness test was 3H. The moldability was evaluated as "Bad" because the surface of the hard-coat layer was cracked. At the time of molding, ruptures were generated in a part of the laminate. The thermal resistance was evaluated as "Bad" because cracks were generated. The external film appearance was evaluated as good, namely, "Excellent".

Comparative Example 8

The resin (B21) was used instead of the resin (B11), and the resin (A24) was used instead of the resin (A11). The temperatures of the rolls were 130° C., 130° C. and 140° C. Except for these, substantially the same procedure as in example 1 was performed to obtain a laminate (E15) of the (A24) and the (B21). The obtained laminate had a total thickness of 0.5 mm, and the (A24) high-hardness layer had a thickness of 60 μm in a central part thereof. The result of the pencil scratch hardness test was 3H. Regarding the external film appearance of the obtained sample, a lamination flaw was generated. The moldability and the thermal resistance were both evaluated as good, namely, "Excellent".

Comparative Example 9

The resin (B21) was used instead of the resin (B11), and the resin (A24) was used instead of the resin (A11). The temperatures of the rolls were 130° C., 130° C. and 140° C. Except for these, substantially the same procedure as in example 1 was performed to obtain a laminate (E16) of the (A24) and the (B21). The obtained laminate had a total thickness of 0.125 mm, and the (A24) high-hardness layer had a thickness of 60 μm in a central part thereof. The result of the pencil scratch hardness test was 2H. Regarding the external film appearance of the obtained sample, a lamination flaw was generated. The moldability and the thermal resistance were both evaluated as good, namely, "Excellent".

Comparative Example 10

The resin (A22) was used instead of the resin (A11). Except for this, substantially the same procedure as in example 1 was performed to obtain a laminate (E17) of the (A22) and the (B11). The obtained laminate had a total thickness of 0.5 mm, and the (A22) high-hardness layer had a thickness of 60 μm in a central part thereof. The result of the pencil scratch hardness test was F. The moldability, the thermal resistance, and the external film appearance were all evaluated as good, namely, "Excellent".

Comparative Example 11

The resin (A23) was used instead of the resin (A11), and the resin (B21) was used instead of the resin (B11). Except for these, substantially the same procedure as in example 1 was performed to obtain a laminate (E18) of the (A23) and the (B21). The obtained laminate had a total thickness of 0.125 mm, and the (A23) high-hardness layer had a thickness of 60 μm in a central part thereof. The result of the pencil scratch hardness test was HB. The moldability, the thermal resistance, and the external film appearance were all evaluated as good, namely, "Excellent".

Comparative Example 12

The resin (B21) was used instead of the resin (B11). Except for this, substantially the same procedure as in example 1 was performed to obtain a laminate (E19) of the (A11) and the (B21). The obtained laminate had a total thickness of 0.5 mm, and the (A11) high-hardness layer had a thickness of 60 μm in a central part thereof. Regarding the external film appearance of the obtained sample, a lamination flaw was generated. The result of the pencil scratch hardness test was 2H. The moldability and the thermal resistance were evaluated as good, namely, "Excellent".

From Tables 1 and 2, it is seen that the synthetic resin laminates according to the present invention have high thermoformability (pressure formability, thermal-bending formability), high insert moldability, high surface hardness and/or impact resistance, and high thermal resistance.

TABLE 1

| Example | (A) material [Thickness] | (B) material [Thickness] | (A) surface Hardcoat | Laminate | (A) surface pencil hardness | Moldability | Thermal resistance | External film appearance |
|---|---|---|---|---|---|---|---|---|
| Example 1 | A11 [60] | B11 [440] | No | C11 | 2H | Excellent | Excellent | Excellent |
| Example 2 | A11 [60] | B11 [440] | Yes | D11 | 3H | Excellent | Excellent | Excellent |
| Example 3 | A12 [60] | B11 [440] | No | C12 | 2H | Excellent | Excellent | Excellent |
| Example 4 | A12 [60] | B11 [440] | Yes | D12 | 3H | Excellent | Excellent | Excellent |
| Example 5 | A13 [60] | B11 [440] | No | C13 | 2H | Excellent | Excellent | Excellent |
| Example 6 | A13 [60] | B11 [440] | Yes | D13 | 3H | Excellent | Excellent | Excellent |
| Example 7 | A11 [60] | B12 [440] | No | C14 | 2H | Excellent | Excellent | Excellent |
| Example 8 | A11 [60] | B12 [440] | Yes | D14 | 3H | Excellent | Excellent | Excellent |
| Example 9 | A11 [60] | B11 [65] | No | C15 | H | Excellent | Excellent | Excellent |
| Example 10 | A11 [60] | B11 [65] | Yes | D15 | 2H | Excellent | Excellent | Excellent |
| Example 11 | A12 [60] | B11 [65] | No | C16 | H | Excellent | Excellent | Excellent |
| Example 12 | A12 [60] | B11 [65] | Yes | D16 | 2H | Excellent | Excellent | Excellent |

TABLE 1-continued

| Example | (A) material [Thickness] | (B) material [Thickness] | (A) surface Hardcoat | Laminate | (A) surface pencil hardness | Moldability | Thermal resistance | External film appearance |
|---|---|---|---|---|---|---|---|---|
| Example 13 | A13 [60] | B11 [65] | No | C17 | H | Excellent | Excellent | Excellent |
| Example 14 | A13 [60] | B11 [65] | Yes | D17 | 2H | Excellent | Excellent | Excellent |
| Example 15 | A11 [60] | B12 [65] | No | C18 | H | Excellent | Excellent | Excellent |
| Example 16 | A11 [60] | B12 [65] | Yes | D18 | 2H | Excellent | Excellent | Excellent |
| Example 17 | A11 [60] | B11 [940] | No | C19 | 2H | Excellent | Excellent | Excellent |

TABLE 2

| Example | (A) material [Thickness] | (B) material [Thickness] | (A) surface Hardcoat | Laminate | (A) surface pencil hardness | Moldability | Thermal resistance | External film appearance |
|---|---|---|---|---|---|---|---|---|
| Comparative example 1 | A21 [60] | B11 [440] | No | E11 | F | Excellent | Excellent | Excellent |
| Comparative example 2 | A11 [60] | B15 [440] | No | E12 | 2H | Bad | Excellent | Excellent |
| Comparative example 3 | A24 [60] | B15 [440] | No | E13 | 3H | Bad | Excellent | Excellent |
| Comparative example 4 | A24 [60] | B15 [65] | No | E14 | 2H | Bad | Excellent | Excellent |
| Comparative example 5 | A11 [60] | B15 [440] | Yes | F11 | 3H | Bad | Bad | Excellent |
| Comparative example 6 | A24 [60] | B15 [440] | Yes | F12 | 4H | Bad | Bad | Excellent |
| Comparative example 7 | A24 [60] | B15 [65] | Yes | F13 | 2H | Bad | Bad | Excellent |
| Comparative example 8 | A24 [60] | B21 [440] | No | E15 | 3H | Excellent | Excellent | Bad |
| Comparative example 9 | A24 [60] | B21 [65] | No | E16 | 2H | Excellent | Excellent | Bad |
| Comparative example 10 | A22 [60] | B11 [440] | No | E17 | F | Excellent | Excellent | Excellent |
| Comparative example 11 | A23 [60] | B21 [65] | No | E18 | HB | Excellent | Excellent | Excellent |
| Comparative example 12 | A11 [60] | B21 [440] | No | E19 | 2H | Excellent | Excellent | Bad |

INDUSTRIAL APPLICABILITY

A synthetic resin laminate according to the present invention has features of being excellent in surface hardness, impact resistance, moldability, thermal resistance and external film appearance, and is preferably usable for a transparent substrate material, a transparent protective material or the like, especially, for a front board or a touch panel of a display section of an information device or a mobile electronic device, or for a thermally bendable sheet.

The invention claimed is:
1. A synthetic resin laminate, comprising:
a resin layer comprising a resin (A) comprising a (meth)acrylate copolymer (a1) and a polycarbonate (a2), and a substrate layer comprising a polycarbonate-based resin (B), the resin layer being laminated on one of, or both of, two surfaces of the substrate layer;
wherein:
the (a1) is a (meth)acrylate copolymer comprising 5 to 80% by mass of aromatic (meth)acrylate unit (a11) and 20 to 95% by mass of methyl methacrylate unit (a12);
the (a2) is a polycarbonate (a2) comprising a structural unit represented by the following formula [1]:

[Chemical formula 1]

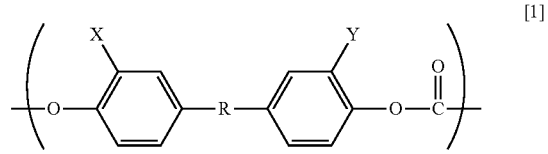

(in the formula [1], R represents a single bond, an alkylene group having 1 through 6 carbon atoms, an arylene group having 6 through 10 carbon atoms, or a cyclic alkylene group having 3 through 8 carbon atoms; and X and Y independently represent a hydrogen atom or an alkyl group having 1 through 6 carbon atoms);

the resin (A) comprises the (a1) at a ratio of 15 to 49% by mass and the (a2) at a ratio of 85 to 51% by mass;

the polycarbonate-based resin (B) is a polymer alloy of a polycarbonate (b1) formed of the formula [1] and a polyester resin (b2); and the polymer alloy has a glass transition temperature (Tg) of 110 to 130° C.

2. The synthetic resin laminate according to claim 1, wherein the polyester resin (b2) is an aromatic polyester resin.

3. The synthetic resin laminate according to claim 1, wherein the polycarbonate (b1) and the polyester resin (b2) have a mixing ratio by mass of b1:b2=30:70 to 75:25.

4. The synthetic resin laminate according to claim 1, wherein the polycarbonate (a2) is a polycarbonate homopolymer or copolymer comprising 20 to 100% by mass of structural unit of the following formula [2]:

[Chemical formula 2]

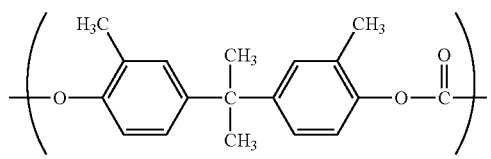

[2]

and 80 to 0% by mass of structural unit of the following formula [3]:

[Chemical formula 3]

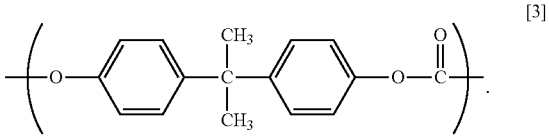

[3]

5. The synthetic resin laminate according to claim 1, wherein the polycarbonate (a2) is a polycarbonate homopolymer formed of the structural unit of the formula [3].

6. The synthetic resin laminate according to claim 1, wherein the polyester resin (b2) is a copolymer polyester obtained as a result of a part of ethyleneglycol in polyethyleneterephthalate being substituted with cyclohexanedimethanol.

7. The synthetic resin laminate according to claim 1, wherein the (meth)acrylate copolymer (a1) has a weight-average molecular weight of 5,000 to 30,000 and the polycarbonate (a2) has a weight-average molecular weight of 21,000 to 43,000.

8. The synthetic resin laminate according to claim 1, wherein the resin layer comprising the resin (A) has a thickness of 30 to 120 μm, the synthetic resin laminate has a total thickness of 0.1 to 2.0 mm, and the ratio of the thickness of the resin layer/total thickness of the synthetic resin laminate is 0.01 to 0.5.

9. The synthetic resin laminate according to claim 1, wherein the resin layer and/or the substrate layer comprises an ultraviolet absorber.

10. The synthetic resin laminate according to claim 1, wherein the resin layer comprising the resin (A) is laminated only on one surface of the substrate layer comprising the polycarbonate-based resin (B), and the resin layer comprising the resin (A) and the substrate layer comprising the polycarbonate-based resin (B) are hard-coated.

11. A molded body, formed by preparing a printing layer on the substrate layer of the synthetic resin laminate according to claim 1, forming a hard-coat layer on the resin layer of the synthetic resin laminate so as to form a hard-coat sheet, and two-dimensionally bending the hard-coat sheet under heating and pressurization.

12. A three-dimensional molded body, formed by preparing a printing layer on the substrate layer of the synthetic resin laminate according to claim 1, forming a hard-coat layer on the resin layer of the synthetic resin laminate so as to form a hard-coat sheet, and air-pressure-forming the hard-coat sheet under heating and pressurization.

13. An in-molded body, formed by preparing a printing layer on one surface of the synthetic resin laminate according to claim 1, thermoforming the resultant resin laminate, and injection molding a melted resin on the printing layer so as to form a lining layer.

* * * * *